Dec. 13, 1938. J. MIHALYI 2,140,445
FILM WINDING MECHANISM
Filed May 29, 1937
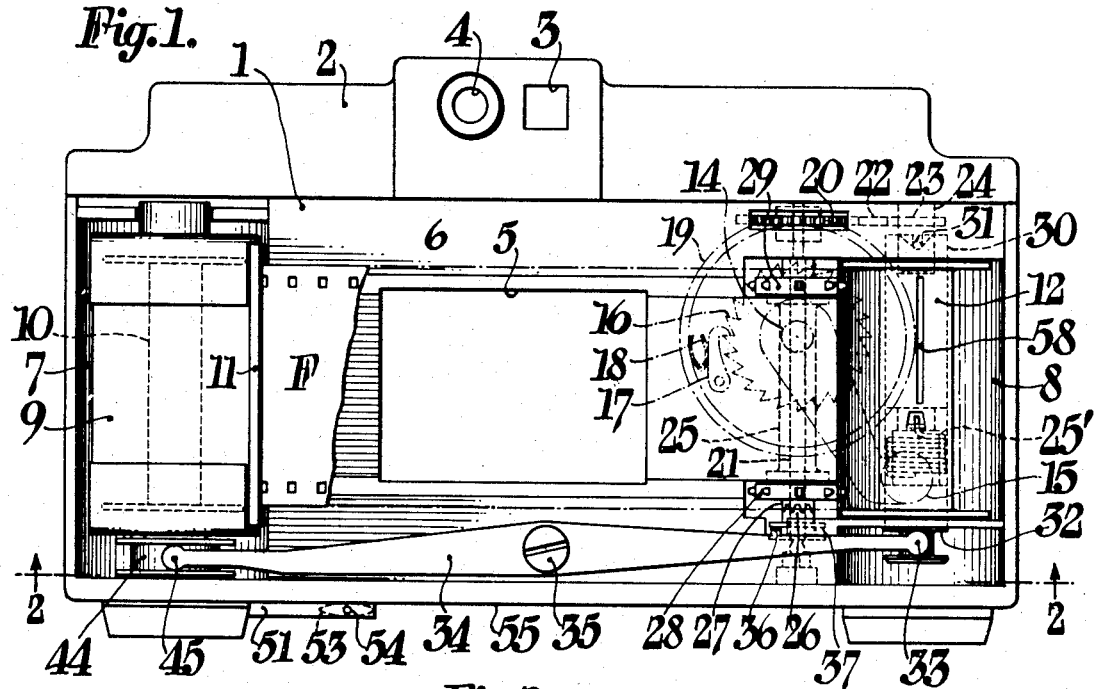
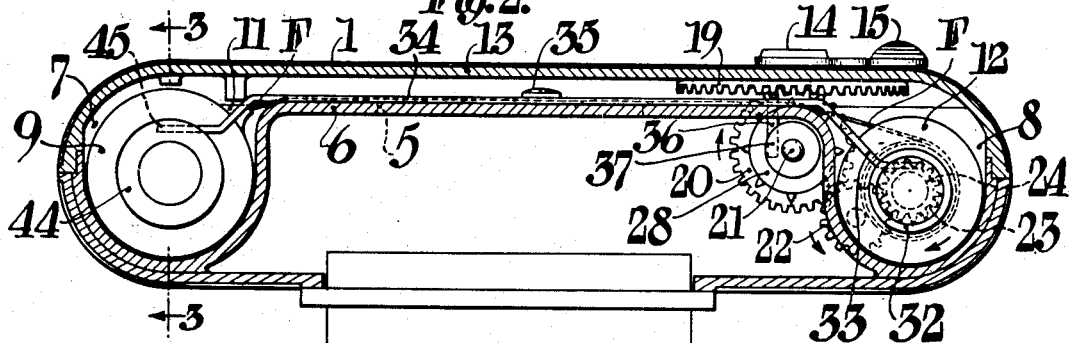
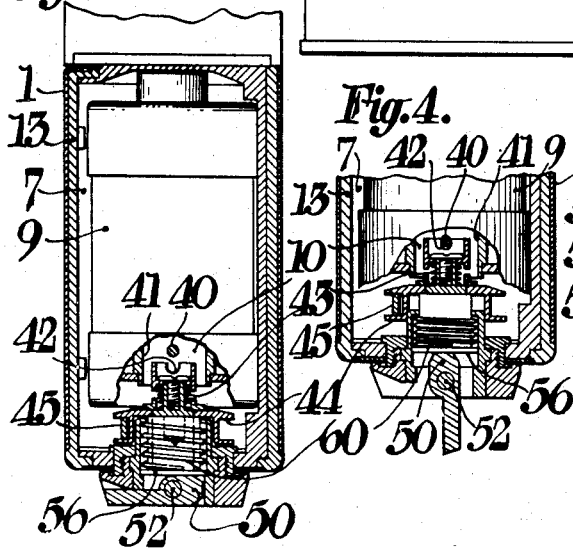
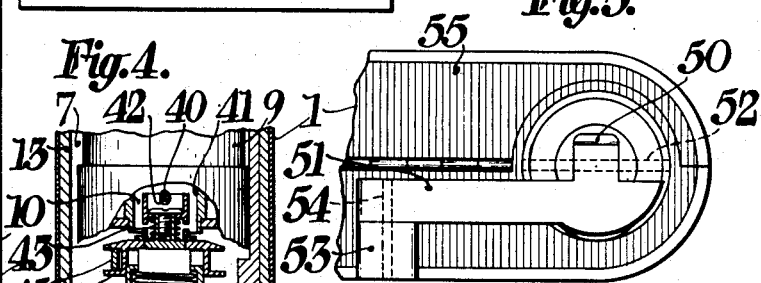
Joseph Mihalyi, INVENTOR
BY
Newton M. Perrins
Donald H. Stewart
ATTORNEYS.

Patented Dec. 13, 1938

2,140,445

UNITED STATES PATENT OFFICE 2,140,445

FILM WINDING MECHANISM

Joseph Mihalyi, Rochester, N. Y., assignor to Eastman Kodak Company, Rochester, N. Y., a corporation of New Jersey Application May 29, 1937, Serial No. 145,497

11 Claims. (Cl. 242—71)

This invention relates to photography and more particularly to photographic cameras. One object of my invention is to provide a camera of the type in which film is unwound from a supply spool to a take-up spool intermittently for exposing the various film sections after which the film is rewound on the original spool. Such cameras may use a film retort in which the film wound on the supply spool is made light-tight or may use film spools of the more usual type in which a piece of backing paper or other opaque material is used to render the film package light-tight. Another object of my invention is to provide a camera in which both the film winding and rewinding operations are automatic to the extent that it is not necessary for the operator to adjust any clutch mechanisms. Another object of my invention is to provide a camera with two separate film winding mechanisms, one for winding film in one direction and the other for winding film in an opposite direction, and to provide a means for automatically allowing the operation of one of these winding mechanisms only at one time. Still another object of my invention is to provide cameras with a rewinding handle which is normally positioned in an inoperative position but when moved to an operative position it will not only rewind film but the movement to the operative position will automatically clutch and unclutch the proper parts of the camera so that the camera is in position for the film to be rewound. Still another object of my invention is to provide a camera in which the rewinding film handle is so arranged that if it is accidentally left in an operative position, it is impossible to wind film on a take-up spool. A still further object of my invention is to prevent the film from being rewound until the film winding mechanism for the take-up spool is disengaged, and other objects will appear from the following specification, the novel features being particularly pointed out in the claims at the end thereof.

Coming now to the drawing wherein like reference characters denote like parts throughout, Fig. 1 is a rear elevation of a camera with the camera back removed, constructed in accordance with and embodying a preferred form of my invention. Film winding mechanism partially carried by the camera back and by the camera body is diagrammatically shown in this figure in broken lines.

Fig. 2 is a somewhat simplified sectional view through the camera shown in Fig. 1, the section being drawn on line 2—2.

Fig. 3 is a section taken on line 3—3 of Fig. 2, parts of the film retort being shown in elevation.

Fig. 4 is a fragmentary sectional view showing the rewinding handle in its operative position.

Fig. 5 is a fragmentary bottom plan view showing the film rewinding handle in its inoperative position.

Many of the cameras now on the market of the so-called miniature size use standard 35 mm. perforated motion picture film and this film is generally drawn from a light-tight film retort, exposed in the camera, and then again returned to the retort which encloses a supply film spool. This type of film is also supplied on spools without the retort but since this necessitates backing paper being used, and since the retorts form a particularly safe protection against light leak, the retort type of film is generally preferred.

In the following specification and claims it is to be understood that where I refer to a supply spool, I am referring either to a supply spool on which convolutions of film and backing paper are wound or a supply spool which is enclosed in a film retort on which convolutions of film alone are wound.

Referring now to Fig. 1, the camera may consist of a camera body portion 1 on the top wall of which there is a housing 2 which is adapted to enclose parts of the mechanism such as the range finder and shutter control mechanism not shown. The opening 3 in the housing is the view finder opening and the opening 4 is the opening for the range finder.

The camera is of the usual type in which an exposure frame 5 is provided in the rear wall 6 of the camera and spool chambers 7 and 8 are provided at each side of the exposure frame 5, chamber 7 for the supply spool of film, and chamber 8 for the take-up spool of film.

I have illustrated in spool chamber 7 the film retort 9 of a known type in which a supply film spool 10 is mounted, the film F being drawn between light-tight lips 11 of the retort across the exposure frame 5 and being wound up on the take-up spool designated broadly as 12. In cameras of this type, the spool 12 may be permanently attached to the camera because the film is always returned to the supply roll 10 after exposure.

I provide two separate film winding mechanisms, one for normal use in moving the film between exposures from the supply spool to the take-up spool and the other for rewinding film from the take-up spool to the supply spool after film has been exposed.

The main film winding mechanism which is used for winding the film F upon the spool 12 is the same as the film winding mechanism shown in my copending application Serial No. 137,483, filed April 17, 1937, for "Camera winding device."

So that the present invention may be completely understood, I have diagramatically illustrated such parts of this film winding mechanism as are necessary for a complete understanding of the present invention.

The camera back 13, as shown in Fig. 2, carries a shaft 14 which may be oscillated by a lever 15. Shaft 14 carries affixed thereto a ratchet wheel 16 which is normally engaged by a pawl 17 pressed by a spring 18 into contact with the ratchet teeth so that when the ratchet is moved in a clockwise direction, a dished gear 19 will be moved to wind up film through the following gearing. A gear 20 meshes with the dished gear 19, this gear being affixed to the shaft 21 and meshing with a second gear 22 which in turn meshes with a gear 23 mounted upon the shaft 24.

The shaft 21 passes through a sleeve shaft 25 and terminates in a clutch member 26 which is adapted to engage a clutch member 27 carried by the sprocket wheel 28. The opposite sprocket wheel 29 is connected to sprocket 28 by means of the sleeve shaft 25. Thus, when the handle 15 is oscillated, the sprocket which is composed of the wheels 28 and 29 is turned to measure off a length of exposed film and the shaft 24 is turned.

This shaft is connected to a suitable overrunning clutch mechanism 25' with the take-up spool 12 so that the sprocket and take-up spool may move together for winding film on the latter as is fully described in my copending application.

In order for the sprocket and take-up spool to turn, it is necessary for the clutch elements 26 and 27 of the sprocket and 30 and 31 of the take-up spool to be engaged. This position is shown in Fig. 1. It should be noted that the clutch element 30 is on a shaft which may move axially through the spool 12, this shaft terminating in an annular grooved member 32 in which the end 33 of the clutch connecting member 34 is engaged. This member is in the form of an elongated lever pivoted upon the stud 35 and carrying a lug 36 which extends into the grooved annular member 37 which controls the clutch element 26. When the lever 34 is in the position shown, the two clutch elements are in driving engagement. There is a third clutch element control between lever 34 and this clutch controls the movement of the supply spool 10. As will be noted from Fig. 3, the supply spool 10 is provided with a transverse rod 40 which extends across the hub member 41 of the spool and forms one clutch element, the other clutch element 42 being a notched tubular member pressed upwardly by the spring 43 but held against movement by the grooved roller 44 in which the end 45 of the lever 34 is engaged. As will be seen from Fig. 3, the clutch is disengaged since the lever 34 is in the position shown in Fig. 1. However, if this lever should be rocked about the stud 35 to disengage the sprocket clutch elements 26 and 27 and the adjacent take-up spool clutch elements 30 and 31, the same movement which disengages these two clutches will engage the clutch elements 40 and 42. Thus either the supply winding mechanism or the take-up winding mechanism may be operated but both of these cannot be operated at the same time.

In order to control the movement of the clutch connecting member 35, I provide a cam 50 which forms a part of the film rewinding handle 51 which is pivoted on a shaft 52 and which carries a handle 53 which may turn upon the shaft 54. This rewinding handle is thus foldably mounted on the bottom wall 55 of the camera and when in its usual inoperative position it lies flat against the bottom wall as indicated in Figs. 1 and 5.

However, after the film has been exposed and has been wound on the take-up spool 12 and it is desired to return the film to the supply spool 10, which may or may not be enclosed in a retort 9, the handle 51 is turned about its shaft 52 into an operative position. This movement causes the cam 50 to press upwardly upon the sleeve 56 thrusting the grooved roller 44 upwardly and engaging the clutch elements 40 and 42. At the same time the end 45 of the clutch connecting member 34 moves upwardly rocking the member about the pivot 35 and simultaneously releasing the sprocket clutch members 26 and 27 and the take-up clutch members 30 and 31. The entire operation of adjusting the clutch therefore takes place merely by moving the winding mechanism handle to its operative position. This handle may then be rapidly rotated to return the film F into the retort 9 and since the clutches of the sprocket and spool are disconnected, these members rotate freely and offer practically no resistance to the return movement of the film. As soon as the film has been completely returned to the supply spool 10, the retort 9 and the spool 10 may be removed from the supply spool chamber 7 and a fresh spool substituted therefor. The film may then be threaded in the usual manner by attaching the end of the film to the slot 58 of the spool 12 and the camera back may be pressed on the camera.

If the operator has forgotten to fold the handle 51 flat against the camera bottom wall 55, it will be impossible for the main winding mechanism, which is the oscillatable lever 15, to wind film on the spool 12. The handle 15 will move freely until the take-up spool clutch is engaged. This is accomplished merely by folding the supplementary film winding mechanism—including the handle 53 and the arm 51 flat against the camera body. This withdraws the cam 50 from beneath the sleeve 56 and permits the clutch connecting lever 34 to rock about its pivot 35 under the impulse of a spring 60 which tends to return the clutch connecting member to the position shown in Fig. 1 in which the sprocket and take-up clutches are automatically engaged.

I am aware that cameras have been proposed in which a film winding key is carried at each end of the camera so that film may be wound forward and backward and I am not claiming this feature broadly but consider that my invention is primarily directed to the automatic control of the clutches which in turn control the two film winding mechanisms shown and described. It is obvious that various changes can be made in the specific form and construction of the parts necessary to accomplish the desired function and I consider as within the scope of my invention all such changes as may come within the scope of the appended claims.

What I claim is:

1. A roll holding device for cameras including spool chambers spaced by an exposure frame, winding mechanisms for both spool chambers, a sprocket connected to one winding mechanism and adjacent one spool chamber, handles for separately operating both winding mechanisms manually, a mount for one of said handles on which it may be folded to and from an operable position, connections between the winding mechanisms operable upon moving the foldable winding handle upon its mount to an operable position for disconnecting the other winding mechanism whereby film may be wound in a reverse direction.

2. A roll holding device for cameras including spool chambers spaced by an exposure frame, winding mechanisms for both spool chambers, a sprocket connected to one winding mechanism and adjacent one spool chamber, handles for separately operating both winding mechanisms manually, a mount for one of said winding mechanism handles on which it may be moved to and from an operable position, connections between the winding mechanisms operable upon moving the foldable winding handle upon its mount to an operable position for disconnecting the other winding mechanism whereby film may be wound in a reverse direction, said mount for the winding mechanism handle including a member engaging said connections between the winding mechanisms and preventing the operation of the sprocket and adjacent spool, except when said handle is moved on its mount and is folded into an inoperative position.

3. A roll holding device for cameras including spool chambers spaced by an exposure frame, winding mechanisms for both spool chambers, a sprocket connected to one winding mechanism and adjacent one spool chamber, handles for separately operating both winding mechanisms manually, a mount for one of said handles on which it may be moved to and from an operable position, connections between the winding mechanisms operable upon moving the foldable handle upon its mount to an operable position for disconnecting the other winding mechanism whereby film may be wound in a reverse direction, said foldable handle mount including a member engaging said connections between the winding mechanism and preventing the operation of the sprocket and adjacent spool, except when said handle is folded into an inoperative position, and spring means for moving the winding mechanism connections whereby the manually operable winding mechanisms for the sprocket and adjacent spool may be operated to wind film thereon.

4. In a roll holding device for cameras including an exposure frame with spool chambers at each end, the combination with two manually operable film winding devices, one for each spool chamber, one constituting a main winding device and including a take-up spool on which film may be moved as exposed, and the other constituting a supplementary winding device adapted to rewind film on the original or supply spool, a foldable handle for the supplementary winding device, a clutch mechanism for each spool adapted to engage only one winding mechanism and spool at a time, and means operable by unfolding the foldable handle for operating the clutch mechanism releasing the main film winding mechanism and connecting the supplementary film winding mechanism with the unfolded winding handle whereby exposed film may be returned to the supply spool.

5. In a roll holding device for cameras including an exposure frame with spool chambers at each end, the combination with two manually operable film winding devices one for each spool chamber, one constituting a main winding device and including a take-up spool on which film may be moved as exposed and the other constituting a supplementary winding device adapted to rewind film on the original or supply spool, a measuring sprocket adapted to turn with the main winding mechanism and operatively connected thereto through a clutch, a foldable handle for the supplementary winding device, a clutch mechanism for each spool, and connections between the three clutches for simultaneously operating the take-up spool and sprocket clutches in an opposite direction to the supply spool clutch, a cam carried by the foldable handle, said clutch connections being operated by said cam in moving the handle to an operable position whereby the supplementary film winding mechanism may rewind film onto the supply spool as the unclutched take-up spool and sprocket turn idly.

6. In a roll holding device for cameras including an exposure frame with spool chambers at each end, the combination with two manually operable film winding devices one for each spool chamber, one constituting a main winding device and including a take-up spool on which film may be moved as exposed and the other constituting a supplementary winding device adapted to rewind film on the original or supply spool, a measuring sprocket adapted to turn with the main winding mechanism and operatively connected thereto through a clutch, a foldable handle for the supplementary winding device, a clutch mechanism for each spool, and connections between the three clutches for simultaneously operating the take-up spool and sprocket clutches in an opposite direction to the supply spool clutch, a cam carried by the foldable handle, said clutch connections being operated by said cam in moving the handle to an operable position whereby the supplementary film winding mechanism may rewind film onto the supply spool, said cam releasing said connections as said handle is folded, and spring means for returning said clutches through the clutch connecting member whereby the supply spool may be released and the take-up spool and sprocket may be again connected with the main film winding mechanism.

7. In a roll holding device for cameras including an exposure frame and spool chambers at each end thereof, the combination with a supply and a take-up spool, one mounted in each spool chamber, of a film sprocket, mounted adjacent one spool chamber, the axes of the spools and sprocket being parallel, three clutch members axially arranged with respect to the spools and sprocket each movable to and from an operative position, clutch connecting means for causing the sprocket and take-up clutches to operatively engage as the supply spool clutch disengages and vice versa, film spool winding mechanisms axially arranged with respect to the two spools and sprocket, a film winding handle foldably carried by the camera, means carried by the handle for moving the clutch connecting means as the handle is unfolded to an operative position to disconnect said sprocket and take-up spool clutches, said movement being adapted to engage the supply spool clutch, whereby the foldable handle may be used to rewind film on said supply reel.

8. In a roll holding device for cameras including an exposure frame and spool chambers at each end thereof, the combination with a supply spool and clutch mounted in one spool chamber, a take-up spool and clutch mounted in the other spool chamber, a take-up sprocket mounted near said take-up spool, a clutch for the sprocket, means for turning said take-up spool and sprocket to wind film on the take-up spool as the supply reel runs free, and connections between the three clutch members including a lever arm, a pivotal mount for the lever arm between the spool chambers and including three lugs adapted to operate said clutch members to and from a position in which the take-up spool and sprocket clutches may be engaged and the supply spool clutch may be released by rocking said lever upon its pivot.

9. In a roll holding device for cameras including an exposure frame and spool chambers at each end thereof, the combination with a supply spool and clutch mounted in one spool chamber, a take-up spool and clutch mounted in the other spool chamber, a take-up sprocket mounted near said take-up spool, a clutch for the sprocket, means for turning said take-up spool and sprocket to wind film on the take-up spool as the supply reel runs free, connections between the three clutch members adapted to operate said clutch members to and from a position in which the take-up spool and sprocket clutches may be engaged and the supply spool clutch may be released, said connections including a single pivoted lever having three clutch engaging arms, and means for winding film on the supply reel when the take-up spool and sprocket clutches are unclutched from their film winding means comprising a handle interconnected to said supply spool.

10. In a roll holding device for cameras including an exposure frame and spool chambers on each side, the combination with a supply spool and a take-up spool mounted in the spool chamber, of means for winding film onto the take-up spool and means for rewinding the film on the original supply spool including clutches on the supply and take-up spools, the clutch on the take-up spool being normally engaged, and a rewinding member outside of the camera body pivotally mounted and adapted to be moved on said pivot to and from an operative film rewinding position, a connection between the two spool clutches and means operable by swinging the rewinding member to an operative position for disconnecting the take-up spool clutch and connecting the supply spool clutch.

11. In a roll holding device for cameras including an exposure frame with spool chambers at each end thereof, the combination with a supply spool mounted in one spool chamber and a take-up spool mounted in the other spool chamber, separate winding devices including manually operable handles for turning the supply and take-up spools, clutches between each spool and winding device, means permitting the engagement of but one clutch at a time, one winding handle including a mount on which said handle may move to and from an operable winding position, and connections between the winding devices operable by moving the handle on its mount to an operable position for simultaneously operating the clutch members and disengaging the spool from the opposite winding device.

JOSEPH MIHALYI.